(12) United States Patent
Blazer et al.

(10) Patent No.: US 8,375,624 B2
(45) Date of Patent: Feb. 19, 2013

(54) CARPENTER BEE TRAPS

(76) Inventors: Brian Robert Blazer, Heflin, AL (US);
Bradley Jerome Blazer, Granite Falls, NC (US)

( * ) Notice: Subject to any disclaimer, the term of this patent is extended or adjusted under 35 U.S.C. 154(b) by 679 days.

(21) Appl. No.: 12/430,148

(22) Filed: Apr. 27, 2009

(65) Prior Publication Data
US 2010/0269402 A1    Oct. 28, 2010

(51) Int. Cl.
*A01M 1/20* (2006.01)
(52) U.S. Cl. ............... 43/107; 43/133; 43/134
(58) Field of Classification Search ......... 43/107, 43/133, 134
See application file for complete search history.

(56) References Cited

U.S. PATENT DOCUMENTS

| | | | |
|---|---|---|---|
| 1,772,729 A * | 8/1930 | Pisani | 43/107 |
| 1,968,954 A * | 8/1934 | Metzger | 43/107 |
| 2,035,546 A | 3/1936 | Hamilton | |
| 6,112,452 A | 9/2000 | Campbell | |
| 6,138,402 A | 10/2000 | Wotton | |
| 6,158,165 A * | 12/2000 | Wilson | 43/66 |
| 6,754,988 B1 * | 6/2004 | Downey | 43/107 |
| 6,766,611 B2 | 7/2004 | Prince | |
| 7,222,453 B2 * | 5/2007 | Uhl | 43/122 |
| 2006/0137240 A1 * | 6/2006 | Dismore | 43/107 |
| 2007/0006519 A1 | 1/2007 | Gunderman | |
| 2008/0052982 A1 | 3/2008 | Windsor | |
| 2010/0139151 A1 * | 6/2010 | Cwiklinski et al. | 43/107 |

OTHER PUBLICATIONS

1.Pest Notes Publication 7417 University of California Agriculture and Natural Resources Revised Feb. 2004 Technical Editor: M. L. Flint Coordination, Design, and Production: M. Brush Illustration: David Kidd http://www.ipm.ucdavis.edu/PDF/PESTNOTES/pncarpenterbees.pdf.

* cited by examiner

*Primary Examiner* — Christopher P Ellis

(57) ABSTRACT

A carpenter bee trap having at least one entrance hole, at least one plenum section connecting the at least one entrance hole to at least one receptacle adapter coupling, and least one removable receptacle attached to at least one receptacle adapter coupling, the at least one removable receptacle made of a material that admits ambient light to a greater extent than the material forming the plenum such that insects entering the trap follow a path of increasing intensity of ambient light that leads them to the receptacle. In one embodiment, existing carpenter bee nests are treated with a disclosed insecticide gel. The insecticide gel consists of a thixotropic, injectable, non-hardening, non-volatile gel blended with a pyrethroid insecticide, in effect converting the bee nest into a trap.

12 Claims, 10 Drawing Sheets

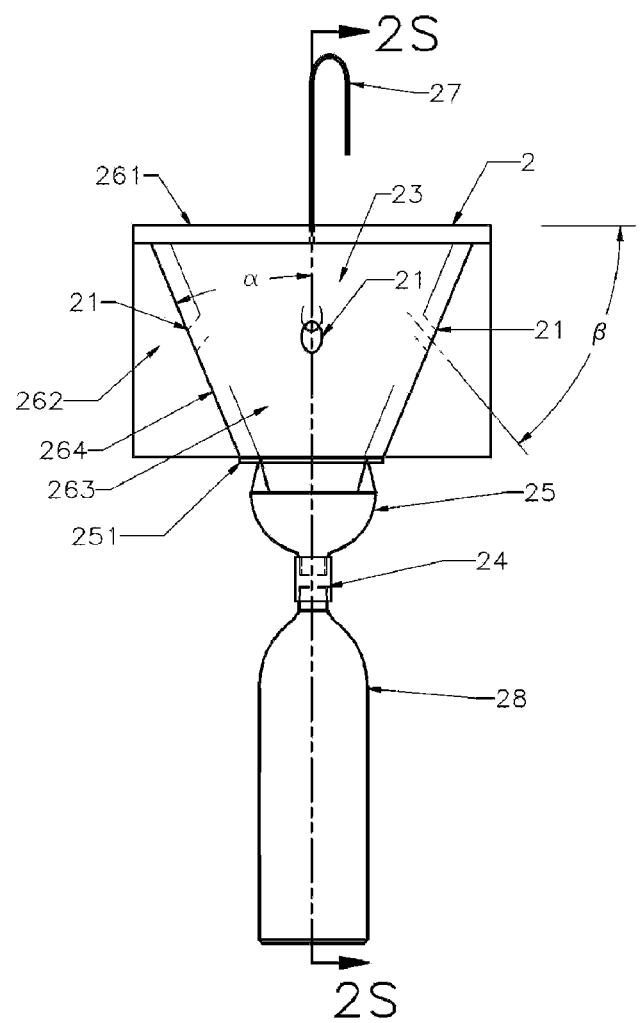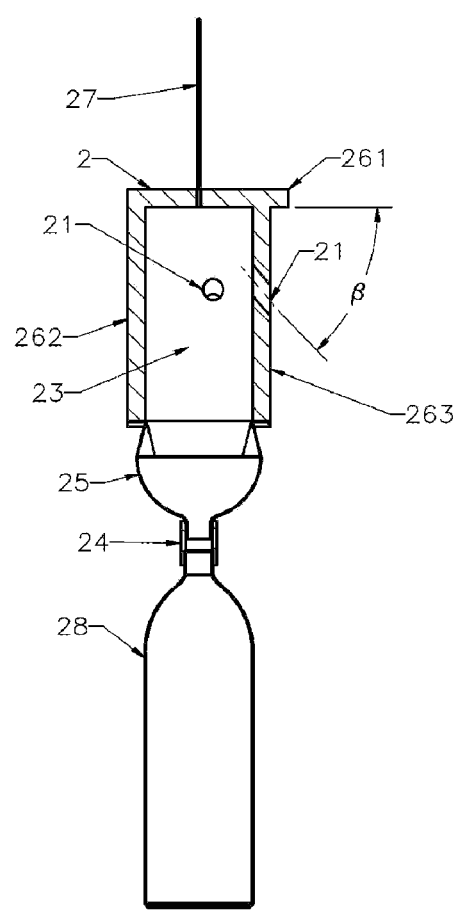
Fig. 2A
Fig. 2B

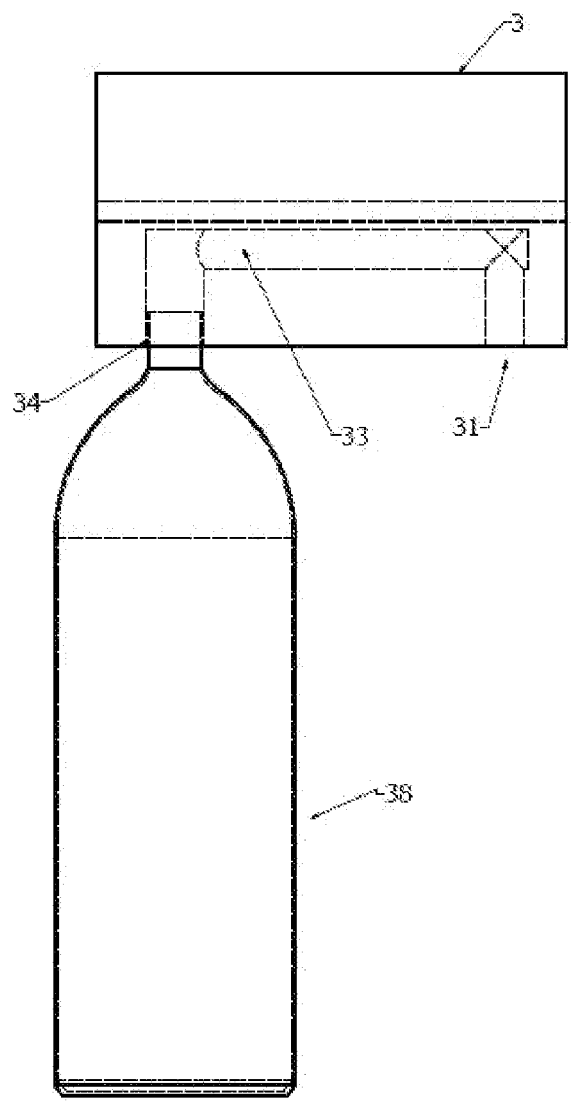
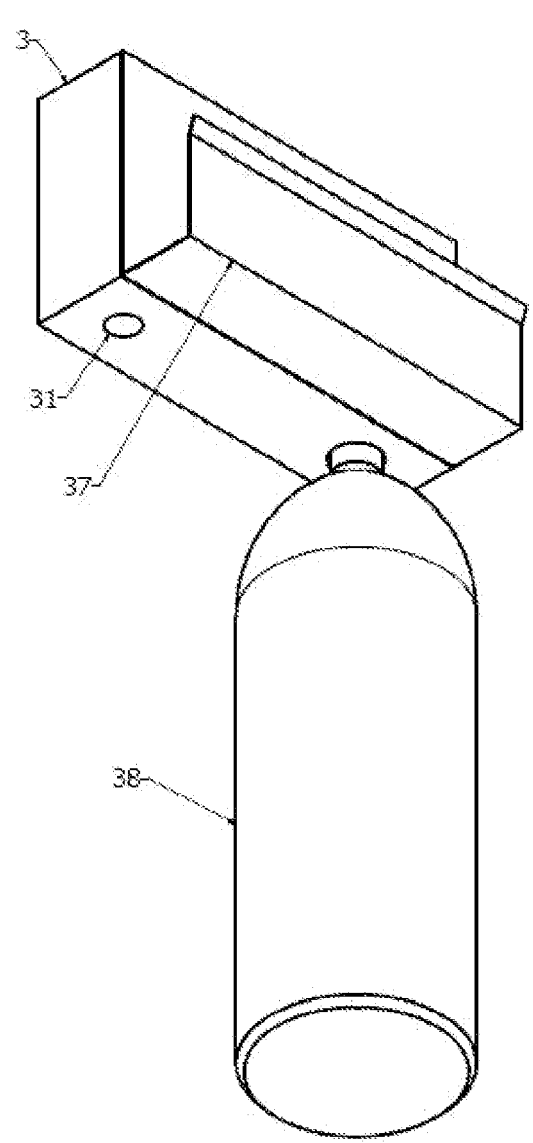
Fig. 3A
Fig. 3B

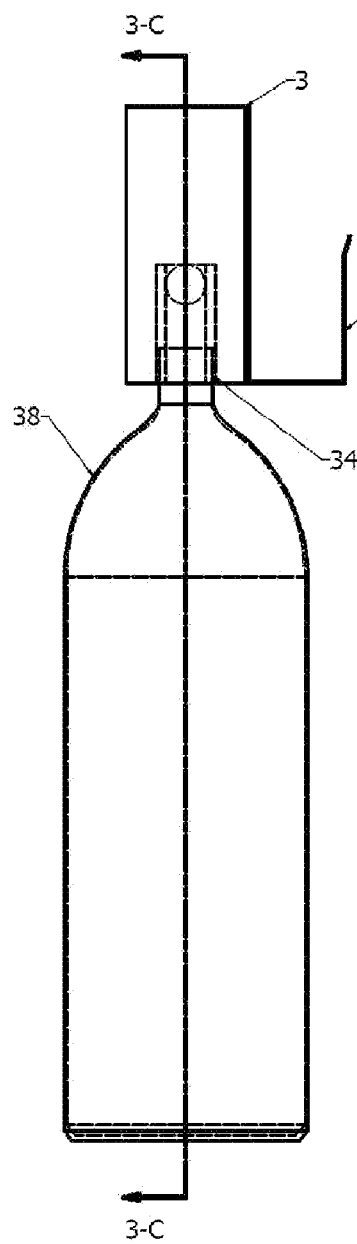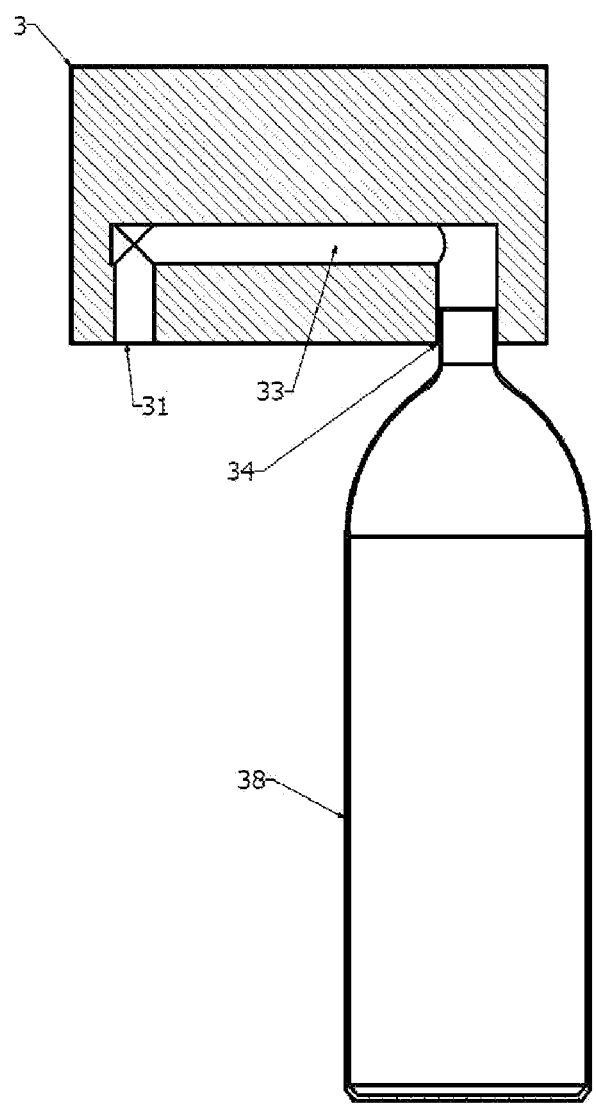
Fig. 3C
Fig. 3D

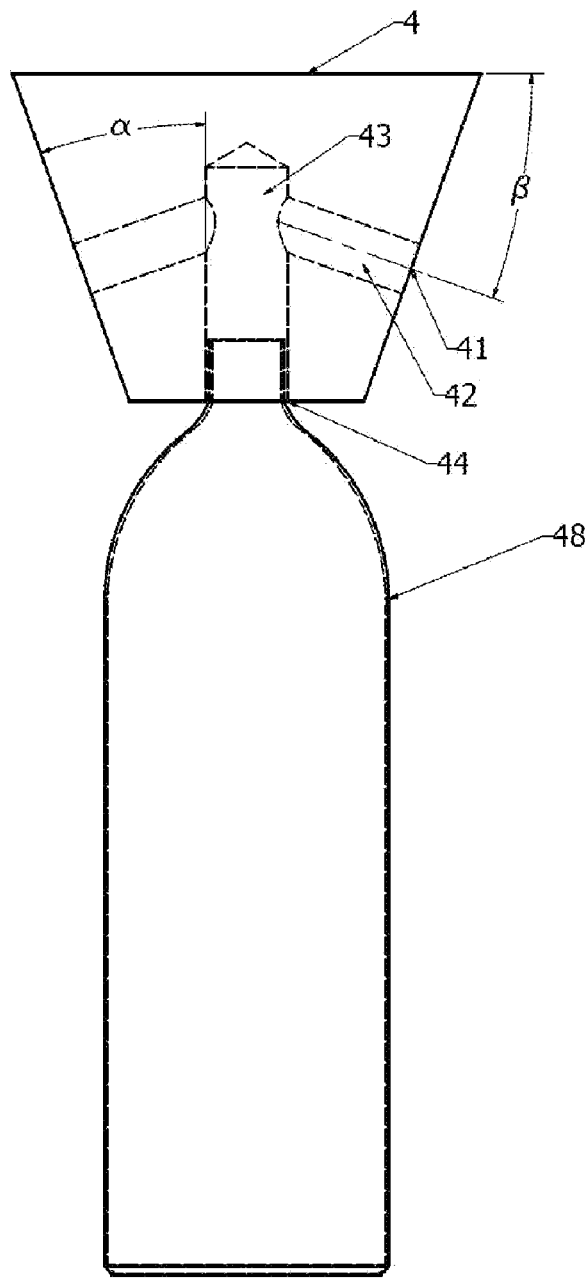 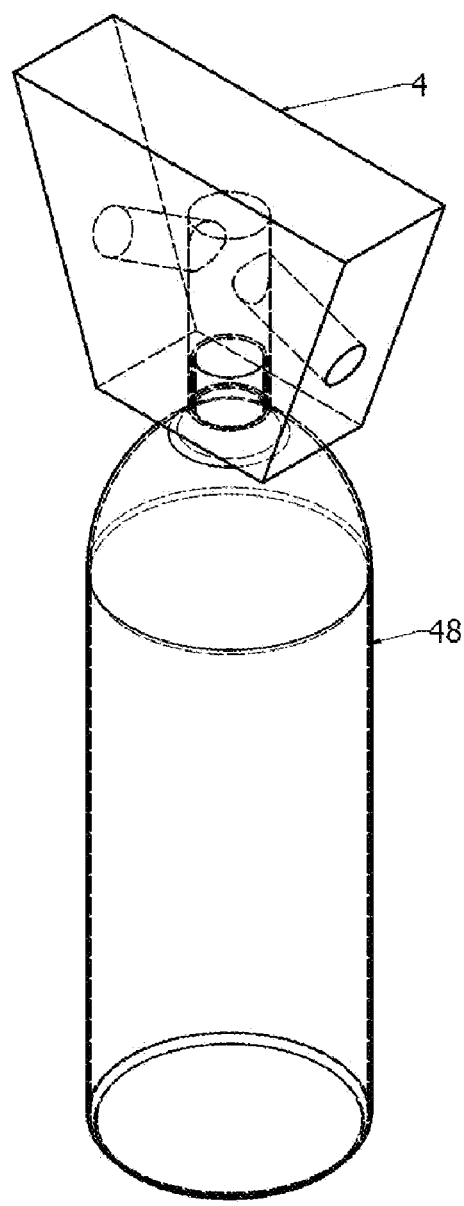
*Fig. 4A*     *Fig. 4B*

CARPENTER BEE TRAPS

FIELD OF THE INVENTION

The present invention relates to the general field of flying insect traps and the specific field of carpenter bee traps.

BACKGROUND OF THE INVENTION

Carpenter Bee Identification

Most carpenter bees, *Xylocopa* spp., are large and robust insects resembling bumble bees. They are usually about 1 inch long and colored a metallic blue-black with green or purplish reflections. They differ from bumble bees in that their abdomen is shiny with fringes of hairs on some segments. Males of some species are lighter colored, ranging into golden or buff hues. Female carpenter bees bore into sound wood or sometimes into decaying wood to make nests. Nests usually consist of tunnels ½ inch in diameter and 6 to 10 inches deep that are partitioned into several chambers, each containing an egg and a supply of food (pollen). The tunnel entrance has been noted to slope upward, commonly a near vertical opening in the side or bottom surface of a wooden member. Carpenter bees may use old tunnels for their nests, which they sometimes enlarge; several bees may use a common entry hole connecting to different tunnels. Over a period of time, tunnels may extend as far as 10 feet into wood timbers. Tunnels are vacated after the brood's larval and pupal stages complete their development. Development from egg to adult may take about 3 months. Carpenter bees overwinter as adults, often in old tunnels, and there is only one generation a year.

Carpenter bees cause damage to wooden structures by boring into timbers and siding to prepare nests. The nests weaken structural wood and leave unsightly holes and stains on building surfaces. Woodpeckers feeding on carpenter bee larvae multiply the damage by tearing open the nests. Sound, undecayed wood without paint or bark is usually selected for nests. Farm structures that feature exposed unpainted rafters are particularly susceptible to infestation. Since the bees do not eat the wood, lumber that is naturally insect resistant or treated to resist insects is susceptible to infestation. In testing and field observations, carpenter bees were most attracted to *Juniperus virginiana* wood of the Cupressaceae family, presumably since the aromatic insect-resistant nature of the wood repels parasites of the bees. Standing dead *Juniperus virginiana* trees are conspicuous as sites of carpenter bee colonies in the southeastern United States. Carpenter bees also frequently attack dead wood on trees or lumber from southern yellow pine, white pine, California redwood, cedar, Douglas fir, cypress, mimosa, mulberry, ash, and pecan trees. They avoid most harder woods. The presence of carpenter bees around buildings and wooden structures can be annoying or even frightening; however, males cannot sting and females rarely attack.

SUMMARY OF THE PRIOR ART

Many types of insect traps are currently available but only a few specifically target carpenter bees. One example is Wood-Boring Insect Trap, application Ser. No. 11/846,766. It consists of a board with entrance holes and a glue trap in the interior. The disclosed trap features entry hole geometry that closely mimics natural carpenter bee nest holes, however, the interior glue traps have a very limited capacity and the trap must be dismantled to check whether the trap is full or even whether it is catching bees. Further, trapped dead bees must be individually picked from the glue by hand and replacement glue traps are proprietary to the design and must be ordered from the trap provider at high expense and low convenience.

Carpenter bee trap disclosed in U.S. Pat. No. 6,766,611 is an opaque box with an entrance hole and a means of opening the box to remove trapped bees. It provides little means of preventing bees from exiting the trap, no method for the operator to monitor the contents of the trap, and no positive containment of trapped bees during the removal process.

Electronic Carpenter Bee Trap disclosed in US patent 20070006519 is a block style trap that features an electrode to kill any bee that enters the trap from a hole in the bottom, at which time the dead bee falls from the entrance hole. The high voltage electrodes and their power source add complexity and expense to the trap. Since dead bees are not retained, it is difficult to monitor the effectiveness of the trap.

U.S. Pat. No. 6,138,402 discloses an insect trap that uses a plastic beverage bottle as a collection vessel. Also disclosed is the use of ambient light to confuse the insects. Unfortunately the disclosed trap geometry does not appear to take significant advantage of the ambient light attraction principal and the principal is not well defined.

SUMMARY OF THE INVENTION

It is an objective of the present invention to provide one or more devices and related methods of manufacture and deployment to aid in the protection of structures from carpenter bee infestation. The devices presented herein represent a best effort at providing guidance by way of example to those skilled in the art to reproduce the invention. They are not intended to limit in any way the reproduction of the invention in combinations and or permutations not specifically described. The carpenter bee trap of the present invention is an assembly that includes a trap entrance unit and at least one attached, disposable receptacle. The trap entrance unit features at least one bee entrance hole that slopes upward towards the interior. The upward sloping entrance mimics the preferred entrance style of a natural bee nest while reducing the amount of ambient light entering the entrance hole. The roof of the trap entrance unit overhangs the sides and provides added shelter for at least one entrance hole. The interior of the trap entrance unit forms a plenum which promotes the conveyance of the bees through at least one receptacle adapter and into at least one removable receptacle. The at least one receptacle adapter allows convenient attachment, removal, and replacement of receptacles. The area surrounding the at least one receptacle adapter is sloped such that gravity aids in the conveyance of bees into the at least one receptacle. Further the material of the at least one receptacle and optionally the area surrounding the at least one receptacle adapter has a degree of transparency such that ambient light is admitted in excess of other sources of light within the trap entrance unit plenum. Bees that enter the trap entrance unit plenum will immediately identify the brightly lit at least one receptacle adapter as an exit route at which point they enter the at least one receptacle. Many flying insects including carpenter bees rely heavily on ambient light for navigation and orientation. As a result, bees trapped in the at least one receptacle only try to escape through the transparent walls of the receptacle and do not attempt to return to the dimly lit trap entrance unit plenum. The system has proven highly effective in trapping bees. Bees in the at least one receptacle are unable to escape and eventually die. While a bee is alive in the trap it will make distress noises that attract many more bees to the trap for a cascading effect. Once the receptacle is full of dead bees it can be easily removed, capped, and discarded. The trapped bees tend to pack in tightly and a 16 fluid ounce size receptacle will hold hundreds of bees. Plastic beverage bottles employed as receptacles also provide a positive barrier that can be handled without fear of contact with the trapped bees.

The insecticide gel according to certain embodiments of the present invention consists of an insecticide, preferably a pyrethroid, more preferably permethrin, in a concentration of 0.2 to 2%, blended in a non-volatile, non-hardening, non-skinning thixotropic gel, preferably petroleum jelly. A small amount, preferably 0.1 to 1.0 ml, is injected into existing carpenter bee nests using a pressure applicator, preferably a syringe with volumetric graduations, with an extended nozzle to reach from about 1 inch to about 2 inches into the nest hole. When a bee makes contact with the gel a portion of the gel clings to the bee and the immediate response is for the bee to attempt to clean itself which results in rubbing the gel over it's body, enhancing the effect of the insecticide. Fumes of the gel within the nest are sufficient to induce any bees or larvae within the nest to exit, at which time they contact the insecticide and are destroyed. The residual life of the non-drying insecticide gel applied in bee nests has been demonstrated to exceed 12 months with continuing bee kills noted throughout the period. Once carried outside the nest, the pyrethroid insecticide decomposes rapidly due to sunlight exposure. Long lasting powerful insecticides such as fipronil are highly undesirable in this application because of the likelihood of them spreading to and destroying colonies of beneficial pollinating insects.

The trap entrance unit is preferably hollow and box-like, with 4 side panels, a roof panel that overhangs at least one side to shelter at least one entrance hole, and a sloped bottom surface, that form a plenum which promotes the passage of bees from the at least one entrance hole to the at least one receptacle adapter coupling and into an attached receptacle. Alternatively the trap entrance unit may be made from a solid piece of wood or similar material with a tunnel type plenum similar to natural bee nests. The trap entrance may feature a top anchor point for hanging the trap. Alternatively, a clip may be attached to the trap entrance unit which allows it to be easily attached to an exposed structural element such as a rafter made of dimensional lumber, or the trap entrance unit may be screwed or nailed to a structural element. The trap entrance unit may be installed in a position that blocks an existing bee nest entrance in the lumber. A bee searching for a blocked nest entrance is likely to enter the trap.

A device to generate a sound that mimics a live bee in the trap may be added to certain aspects of the invention to serve as an attractant. The device may be an electronic recording similar to that used in talking greeting cards or a motor driven device similar to the vibrating alerts used in pagers and cellular phones. The sound making device can be powered by batteries which may be recharged by a solar panel on the top of the trap. Similar solar powered batteries are commonly used to power exterior path lighting. Since carpenter bees are most active during the daylight hours, the sound making device may alternatively be powered directly from a solar panel without a storage battery. An attractive scent or pheromone may be added to certain aspects of the invention to enhance the local attractiveness. Strong scent attractants are not a preferred embodiment due to the potential for attracting more insects to the structure to be protected.

In certain embodiments of the disclosed invention, trapped bees are contained in at least one removable receptacle and when the receptacle becomes full it may easily be removed, capped, discarded, and replaced with a new receptacle. Used beverage bottles may serve as replacements or new replacement receptacles may be purchased.

BRIEF DESCRIPTION OF THE DRAWINGS

FIG. 2A depicts a second embodiment of a carpenter bee trap according to the present invention from a frontal view. FIG. 2B depicts the second embodiment of a carpenter bee trap according to the present invention in a section view.

FIG. 3A depicts a third embodiment of a carpenter bee trap according to the present invention from a frontal view. FIG. 3B depicts the third embodiment of a carpenter bee trap according to the present invention from a perspective view. FIG. 3C depicts the third embodiment of a carpenter bee trap according to the present invention from an end view. FIG. 3D depicts the third embodiment of a carpenter bee trap according to the present invention in a section view.

FIG. 4A depicts a fourth embodiment of a carpenter bee trap according to the present invention from a frontal view. FIG. 4B depicts the fourth embodiment of a carpenter bee trap according to the present invention from a perspective view.

DETAILED DESCRIPTION OF THE INVENTION

The carpenter bee trap and insecticide gel disclosed herein are the result of a detailed study of carpenter bee behavior and extensive experimentation using prototype traps around infested structures. Single traps of the disclosed designs have caught bees by the hundreds per day.

Figure 1A:
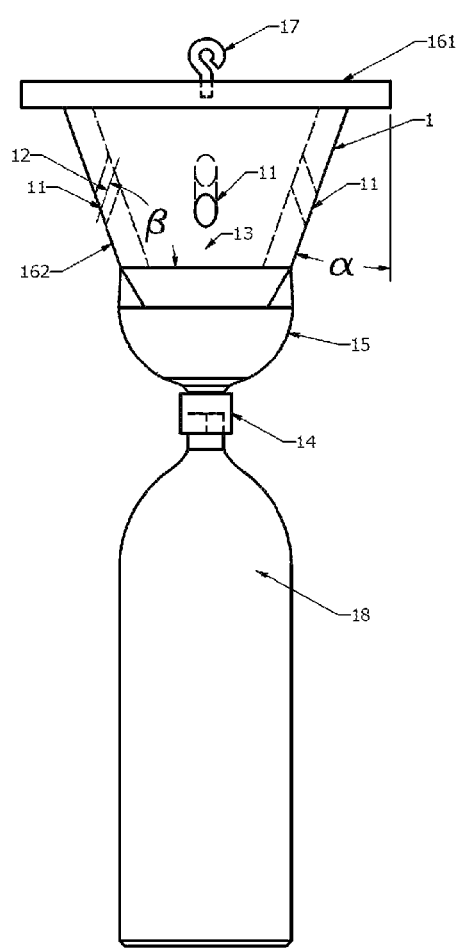
FIG. 1a depicts a first embodiment of a carpenter bee trap according to the present invention from a frontal view.

FIG. 1A depicts a carpenter bee trap of the present invention that is designed to be attractive as well as effective, resembling a bird house. Trap entrance unit 1 features entrance holes 11 leading to plenum 13. A clear sloping bottom section 15 directs bees to receptacle adapter coupling 14, and into clear plastic receptacle 18. The top panel 161 of the entrance unit overhangs side panels 162 to shelter entrance holes 11. Side panels 162 angle outward from vertical by angle a. Entrance holes 11 are angled upward from horizontal by angle b. The material surrounding entrance holes 11 is preferably wood, more preferably wood of a tree in the division *Pinophyta*, most preferably wood of a tree in the family Cupressaceae. At the bottom of trap entrance unit 1 is reducer section 4 made of clear plastic with adapter coupling 5 at the bottom which accepts a clear plastic removable receptacle 6. In the prototype traps reducer section 4 was made from the top of a standard 12-24 ounce PET (polyethylene terephthalate) beverage bottle. Receptacle adapter coupling 5 is a screw type bottle cap with a hole bored through it. In prototype form, adapter coupling 5 is connected to reducer section 4 with a heat shrink tube to form a permanently attached female threaded coupling for the receptacle. In production the reducer 4 and receptacle adapter 5 may be specially molded as one part with molded features such as tabs or inserts for attachment to the bottom of the upper trap unit 1. The disposable receptacle 6 is also a standard PET beverage bottle. Anchor point 17 is provided for hanging the trap. End users of the invention may employ used beverage bottles as collection bottles or purchase new bottles. Prototype trap unit panels were fastened together with pneumatic staplers and brad nailers. Optionally there are a variety of suitable joining methods such as adhesives and interlocking joints that may be employed by those skilled in the art.

When bees enter trap entrance unit 1, they immediately see the ambient light entering from the clear plastic reducer 4 as well as from receptacle 6 through the opening in adapter coupling 5. Attracted by the light, the bees immediately fly to the bottom of the trap where they are quickly funneled into the receptacle 6. Aside from attracting bees, the sheltered entrance hole also prevents ambient light from directly entering the entrance hole and bees within the trap will not identify the entrance hole as an exit. In experiments bees that fully entered the chamber were never observed to escape through the entrance holes despite the absence of a physical labyrinth. Although the clear reducer section 4 enhances the effectiveness of the trap, it is possible for the trap to have an opaque reducer section and rely on the light entering through adapter coupling 5 to guide bees into clear receptacle 6. A further advantage of the clear plastic construction of the reducer and collection bottle is that it allows the user to easily monitor the activity within the trap to gauge the effectiveness of deployment as well as to monitor the level of dead insects within the receptacle. As the receptacle fills, newly trapped bees tend to burrow into the pile of bodies with the result of tightly packing the contents of the receptacle giving it a collection capacity of many hundreds of bees.

Figure 1B:
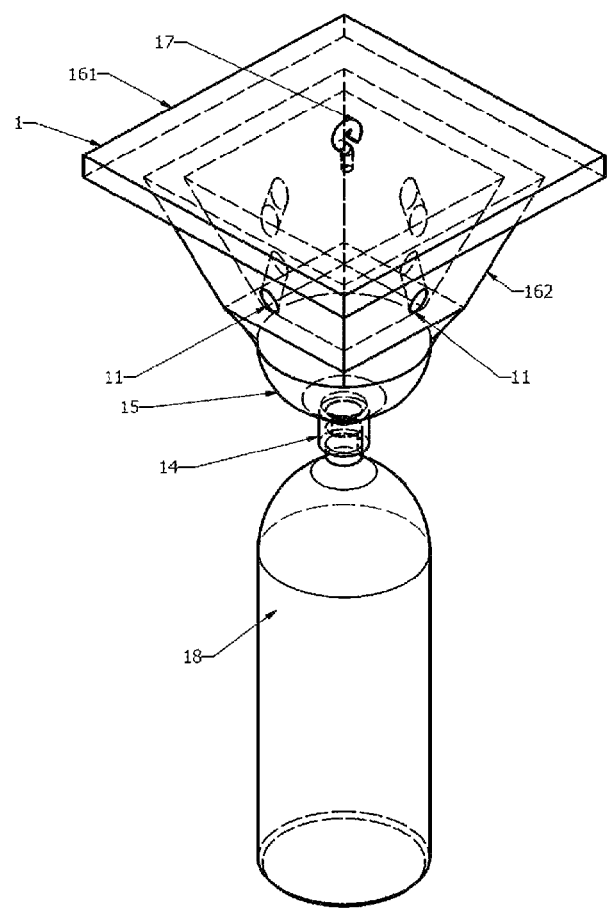
FIG. 1b depicts the first embodiment of a carpenter bee trap according to the present invention from a perspective view.
Figure 2C:
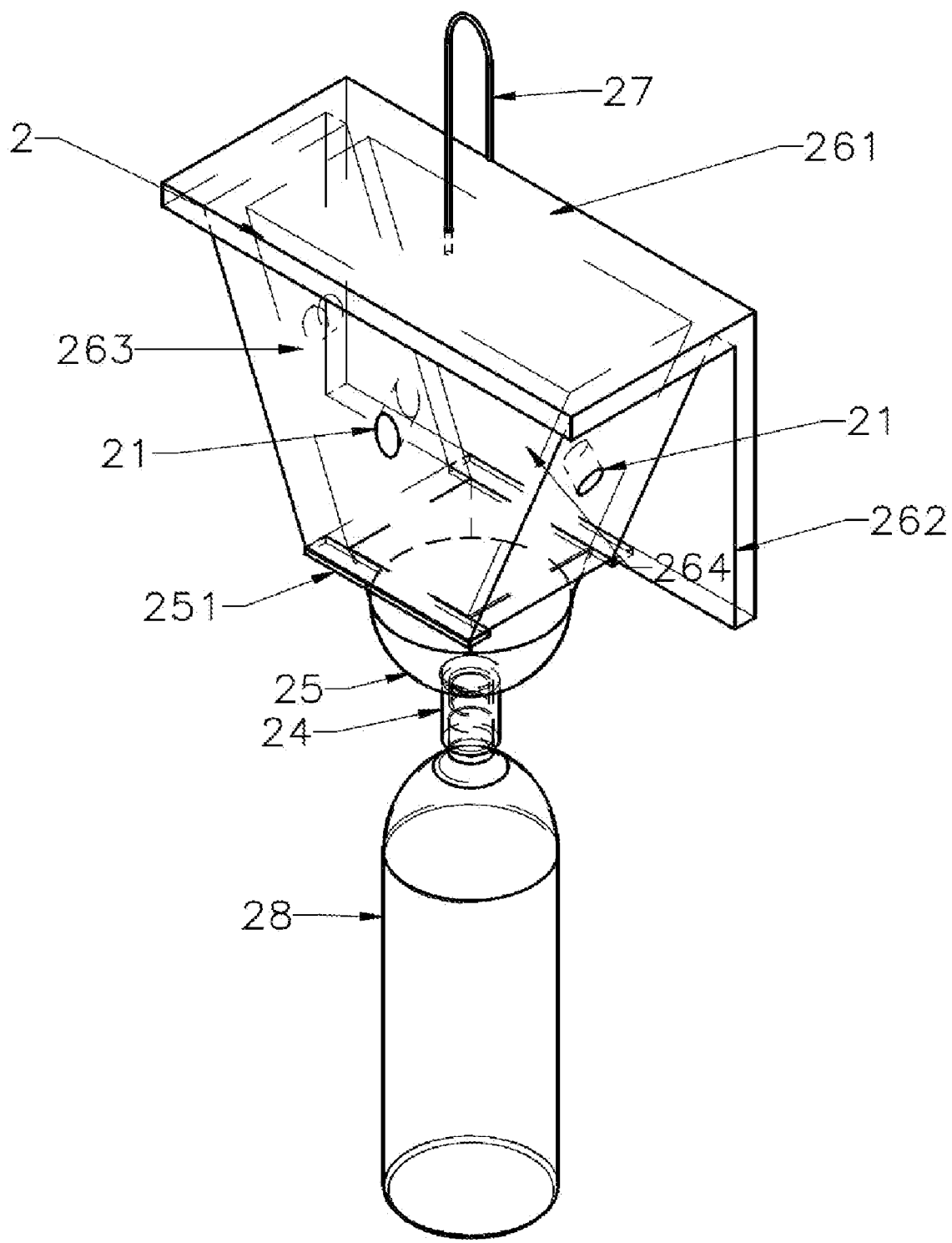
FIG. 2C depicts the second embodiment of a carpenter bee trap according to the present invention from a perspective view.

FIGS. 2a, 2b, and 2c depict a carpenter bee trap according to certain aspects of the present invention that is designed to be easily attached to a wall or other vertical surface. Trap entrance unit 2 features back panel 262 that is vertical and overhangs sides 264 to provide areas where it can be affixed, for example using nails, to a vertical surface such as a wall or rafter. Front panel 263 and side panels 264 feature entrance holes 21 but back panel 262 does not. Front panel 263 is vertical while side panels 264 are angled outward from vertical by angle a. Entrance holes 21 are angled upward from horizontal by angle b. Top 261 overhangs front panel 263 and side panels 264 but is flush with the outside surface of back panel 262. Clear bottom section 25 has top edges that are folded outward and secured to front side 263 and back side 262 by nails and tack strips 251. Clear bottom section 25, adapter coupling 24, and receptacle 28 are similar to respective parts 15, 14, and 18 of trap entrance unit 1 in FIG. 1. Wire hanger 27 is bendable to provide the option of hanging the trap securely from a variety of supporting elements.

FIGS. 3a, 3b, 3c, and 3d depict a carpenter bee trap according to certain aspects of the present invention. Trap entrance unit 3 is constructed from a solid block of wood. Entrance hole 31 is in the bottom of the block and connects to horizontal bore 33 and large vertical bore 34 to form a plenum resembling a natural carpenter bee nest. Vertical bore 34 is sized to allow the insertion of receptacle 38 which is retained by friction. Optionally vertical bore 34 may be threaded or fitted with a threaded insert to positively retain receptacle 38. Horizontal bore 33 is double blind and may be formed by plugging the end where the boring tool enters the block. Receptacle 38 is constructed of a clear material that reflects and refracts ambient light up into vertical bore 34 such that bees entering entrance hole 31 are immediately attracted by the light ant crawl through the plenum and into receptacle 38. Rafter clip 37 is a mounting device designed to allow instant attachment of trap entrance unit 3 to a standard dimensional lumber rafter, for example nominal 2 inch×6 inch or 2 inch×8 inch lumber. Rafter clip 37 may be constructed of an elastic material such as metal or plastic. Rafter clip 37 is attached to the back of trap entrance unit 3 by a single screw or bolt such that the angle of clip 37 is adjustable to allow installation on an angled rafter with the trap entrance unit remaining level. Trap performance may be enhanced by installing the trap to block the entrance of an existing nest. Bees returning to the nest will not find their holes and will enter the trap instead. Additional entrance holes may be added for example to give the option of side or bottom access as long as each entrance hole has a dedicated tunnel leading to adapter area 15 to ensure entering bees are properly directed to the receptacle.

FIGS. 4a and 4b depict a carpenter bee trap according to certain aspects of the present invention with trap entrance unit 4 made from a solid block of wood. Entrance holes 41 are formed by angled bores 42 which extend all the way to deep vertical bore 43 to form the plenum. The end surfaces of trap entrance unit 4 are cut at angle a between 10 and 60 degrees from vertical and bores 42 are made at angle b between 5 and 90 degrees from horizontal to provide sheltered entrance holes 41. The absence of any blind holes in trap entrance unit 4 allows for easy manufacturing of the part. A receptacle adapter 44 at the bottom of vertical bore 43 is a friction fit similar to bore 34 in trap entrance unit 3 and allows convenient insertion and removal of clear receptacle 48.

Figure 5A:
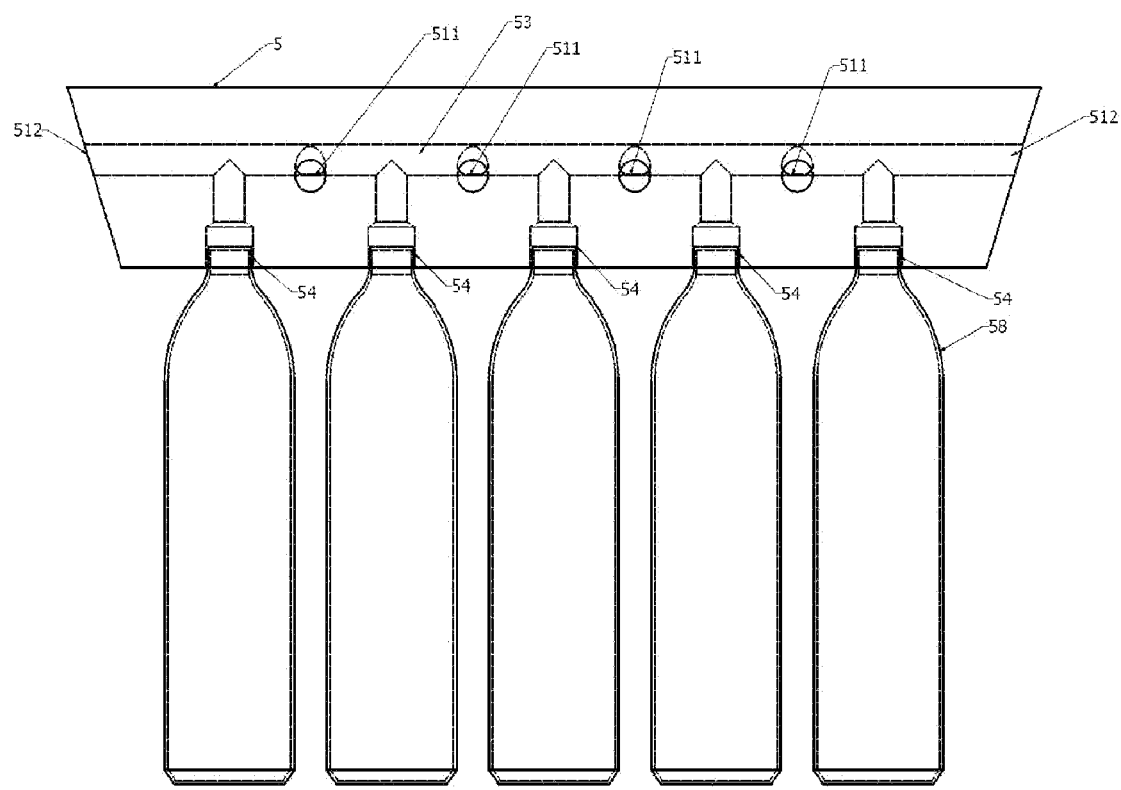
FIG. 5A depicts a fifth embodiment of a carpenter bee trap according to the present invention from a frontal view.
Figure 5B:
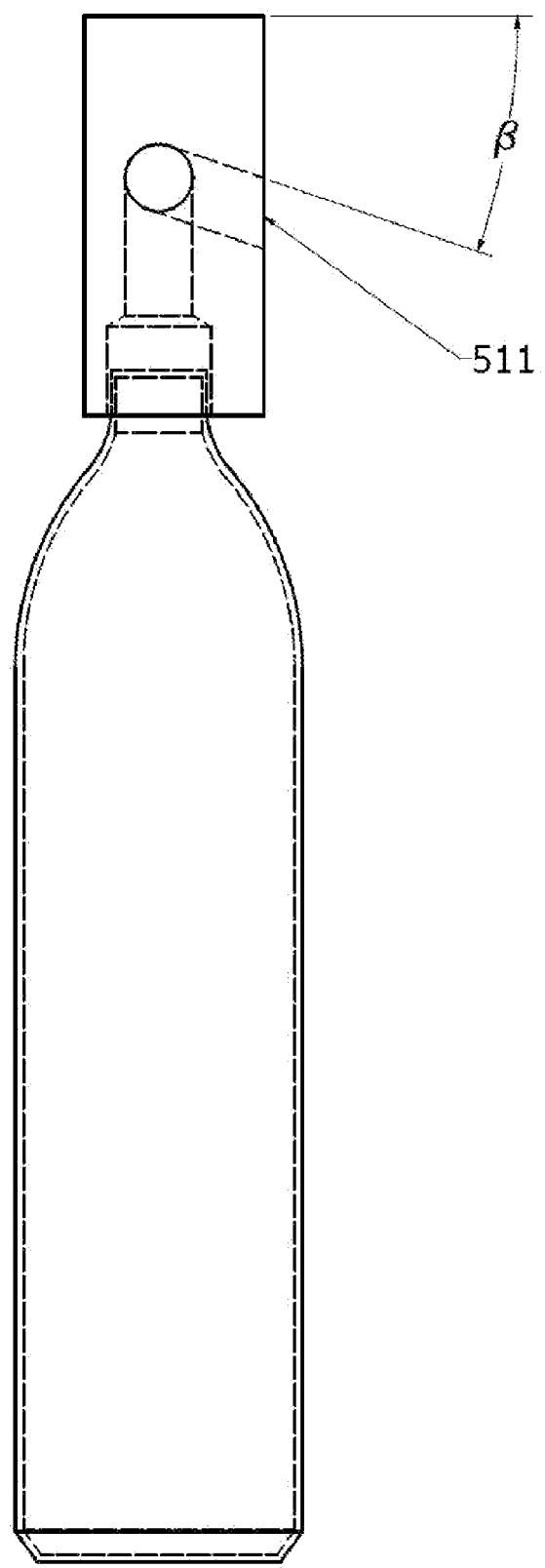
FIG. 5B depicts the fifth embodiment of a carpenter bee trap according to the present invention from an end view.
Figure 5C:
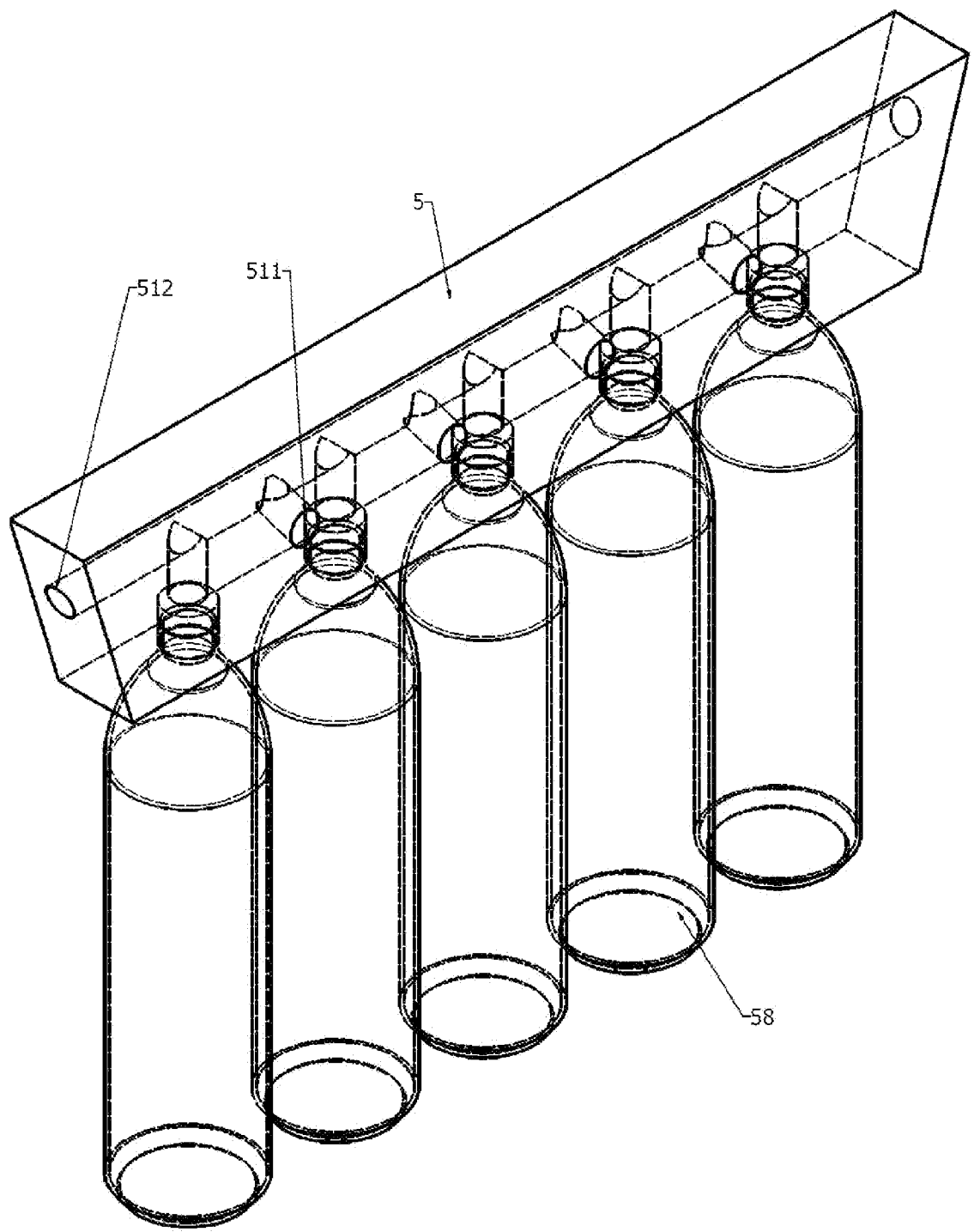
FIG. 5C depicts the fifth embodiment of a carpenter bee trap according to the present invention from a perspective view.

FIGS. 5a, 5b, and 5c depict a carpenter bee trap according to certain aspects of the present invention with multiple receptacles. Trap entrance unit 5 is made from a solid block of wood. Horizontal bore 512 extends through the unit to form two entrance holes and a common plenum connecting additional entrance holes 511 and vertical bores for receptacle adapters 54. As depicted in FIG. 5b, entrance holes 511 are bored at angle b between 10 and 60 degrees from horizontal to provide sheltered entrance holes.

Figure 6:
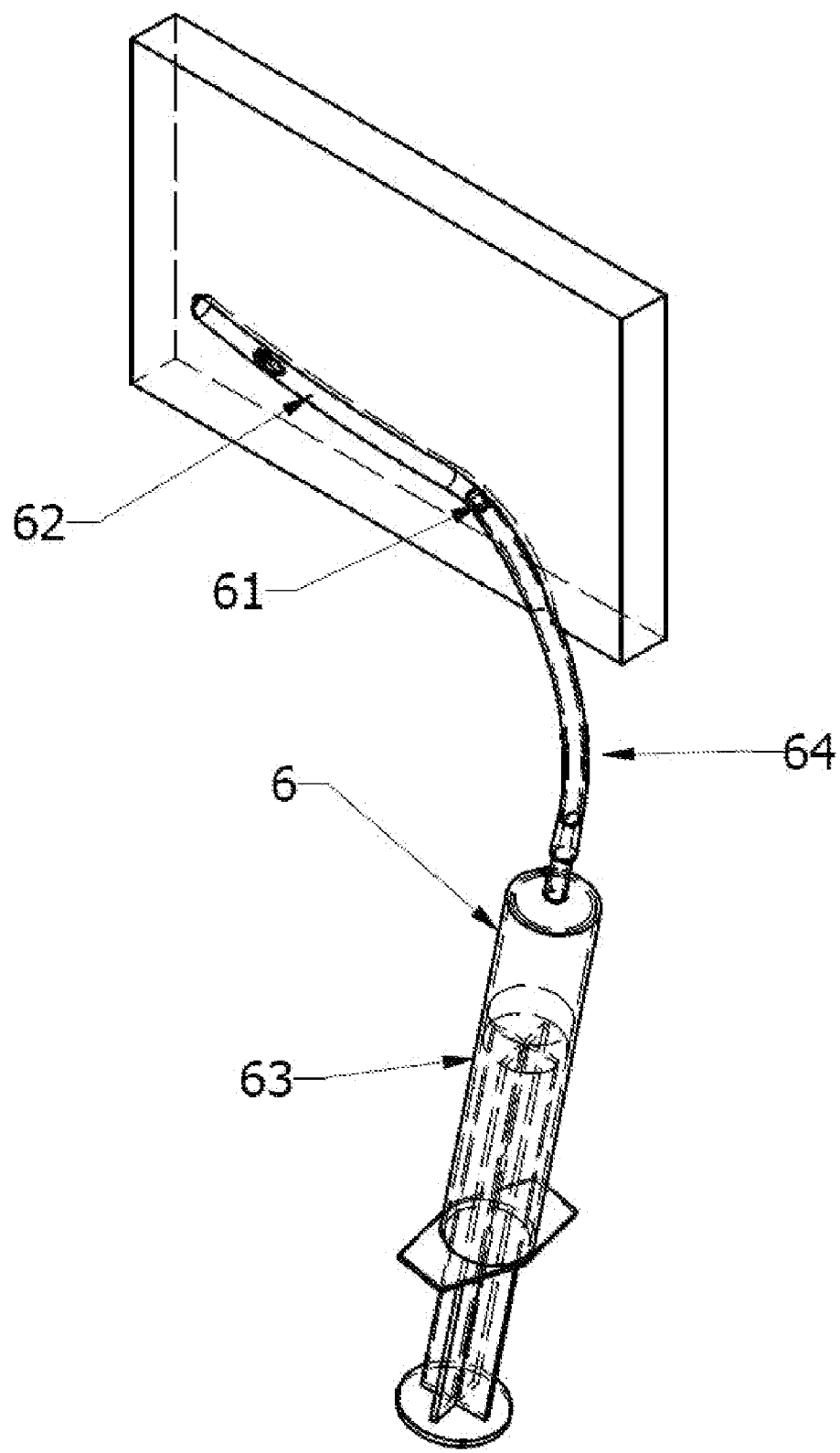
FIG. 6 depicts an insecticide gel application device injecting gel into a carpenter bee nest cross-section according to certain aspects of the present invention.

FIG. 6 depicts an insecticide gel applicator according to certain aspects of the present invention applying insecticide gel 61 into an existing bee nest bore 62 shown in a cross-sectional view. Applicator 6 consists of syringe 63, preferably with a capacity of about 60 cc, with a 150 mm length of nominal ¼ inch diameter pvc flexible tubing 64 attached to the outlet. Gel 61 is composed of an insecticide, preferably a pyrethroid, more preferably permethrin, in a concentration of 0.2 to 2%, blended with a non-volatile, non-hardening, non-skinning thixotropic gel, preferably petroleum jelly. The recommended application rate is from 0.25 cc to 1 cc per bore, annually. When bees contact the gel, it sticks to their body and they will further spread it over their body as they attempt to clean it off, enhancing effectiveness. The insecticide gel is a mild repellent and should never be applied to a trap. The attractiveness of an actual bee nest will typically override the repellent nature of the insecticide gel and treated nests will continue to kill bees for up to one year after a single treatment.

Experimental observation also indicated that carpenter bee traps containing live bees were significantly more productive than empty traps or traps containing only dead bees. Live bees in the trap actively make distressed buzzing noises which appear to be the primary attractant. A sound making device which mimics the sounds of a trapped bee can be added to any of the disclosed trap designs to enhance its effectiveness. An electronic player similar to those used in talking greeting cards or a motor buzzer such as a vibrating cell phone alert device represent two possible options for adding the sound attractant feature. Electrical power for the device may come from a storage battery or solar panel mounted on the device or a combination of the two. Since carpenter bees are most active during the daylight direct solar power can provide the desired effect at the appropriate times.

Proper deployment of the carpenter bee traps disclosed herein is vital to the success of controlling carpenter bees. First, the areas where bees congregate should be identified. Second, existing nest holes should be treated with insecticide gel. Third, carpenter bee traps should be installed near the location of the treated nests and in other areas of carpenter bee congregation. Finally, the traps should be monitored to gauge the effectiveness of placement. Some areas are guarded so aggressively by existing bees that no bees are allowed to enter the trap. If the nests of the existing bees are treated, they will either enter the nests and be killed by insecticide or enter the trap in the evening and subsequently other bees will be able to gain access to the trap. When a trap receptacle is observed to be full, it may be removed, capped, discarded, and replaced with another new or recycled bottle. Alternatively, once all bees are dead it may be emptied and re-used on a trap.

What is claimed:

1. A carpenter bee trap comprising:
   a trap entrance unit forming a plenum being made of wood or a wood substitute;
   said trap entrance unit having at least one hole drilled there-through and sized to mimic a natural carpenter bee nest tunnel so as to provide a primary attractant;
   said hole extending from the outside of the trap unit to a plenum interior; said hole being configured to extend substantially horizontally or at an upward angle; a means to shelter an entrance to said hole is provided to reduce the admittance of ambient light;
   said trap unit further comprising a receptacle adapter being substantially located at the bottom of said trap unit and being configured to receive a clear or translucent receptacle;
   a receptacle received by said adapter situated to allow ambient light to enter through said bottom into said plenum interior, thereby providing a secondary attractant; said receptacle further being provided to receive trapped bees.

2. The carpenter bee trap of claim 1, wherein the receptacle is temporarily attached to the trap.

3. The carpenter bee trap of claim 1, wherein the receptacle is disposable.

4. The carpenter bee trap of claim 1, wherein the receptacle is configured to be screwed into said bottom of said plenum.

5. The carpenter bee trap of claim 1, wherein the receptacle is configured to provide a friction fit with said bottom of said plenum.

6. The carpenter bee trap of claim 1, wherein said plenum interior slopes downwardly toward a center region at an angle between 5 degrees and 90 degrees.

7. The carpenter bee trap of claim 1, wherein the diameter of the at least one hole is between ½ inch to ¾ inch.

8. The carpenter bee trap of claim 1, wherein a back panel of the plenum is vertical and has a flat exterior to allow flush mounting.

9. The carpenter bee trap of claim 1, wherein means to shelter comprises a roof that is angled downwardly.

10. The carpenter bee trap of claim 1, wherein a means to mount the trap is located substantially at the top of the trap entrance unit.

11. The carpenter bee trap of claim 1, wherein a means to mount the trap is located substantially at the back of the trap entrance unit.

12. The carpenter bee trap of claim 1, wherein the trap entrance unit is configured to receive a plurality of receptacles.

* * * * *